United States Patent [19]

Iseler et al.

[11] Patent Number: 5,268,400
[45] Date of Patent: Dec. 7, 1993

[54] FLEXIBLE SHEET MOLDING COMPOUND AND METHOD OF MAKING THE SAME

[75] Inventors: Kenneth A. Iseler, Richmond; Phoebe Duffield, Waterford; Robert C. Yen, Troy, all of Mich.

[73] Assignee: The Budd Company, Troy, Mich.

[21] Appl. No.: 852,777

[22] Filed: Mar. 17, 1992

Related U.S. Application Data

[62] Division of Ser. No. 555,924, Jul. 19, 1990, Pat. No. 5,100,935.

[51] Int. Cl.$^5$ .............................................. C08K 3/26
[52] U.S. Cl. ...................................... 523/514; 524/433
[58] Field of Search ........................ 523/514; 524/433

[56] References Cited

U.S. PATENT DOCUMENTS

| | | |
|---|---|---|
| 3,887,515 | 6/1975 | Pennington et al. ............... 523/514 |
| 4,067,845 | 1/1978 | Epel et al. ........................ 260/40 R |
| 4,076,767 | 2/1978 | Samejima ........................... 260/862 |
| 4,100,229 | 7/1978 | Schwartz, Jr. ..................... 260/887 |
| 4,260,538 | 4/1981 | Iseler et al. ....................... 260/40 R |
| 4,329,438 | 5/1982 | Yamori et al. ...................... 525/64 |
| 4,400,478 | 8/1983 | Gergen et al. |
| 4,488,862 | 12/1984 | Epel et al. ........................ 425/405 R |
| 4,534,888 | 8/1985 | Cobbledick et al. .............. 252/511 |
| 4,535,110 | 11/1986 | Iseler et al. ........................ 524/433 |
| 4,551,085 | 11/1985 | Epel et al. ........................ 425/405 R |
| 4,612,149 | 9/1986 | Iseler et al. ........................ 264/101 |
| 4,622,354 | 4/1986 | Iseler et al. ........................ 523/527 |
| 4,663,388 | 5/1987 | Douglass et al. ................. 525/54.3 |
| 4,745,018 | 5/1988 | Chihara et al. ................... 428/141 |
| 4,808,361 | 2/1989 | Castro et al. ...................... 264/255 |
| 4,839,431 | 6/1989 | Broekhuis .......................... 525/298 |
| 4,855,097 | 8/1989 | Iseler et al. ........................ 264/129 |
| 4,867,924 | 9/1989 | Schilkey et al. ................... 264/101 |
| 5,100,935 | 3/1992 | Iseler et al. ........................ 523/514 |

OTHER PUBLICATIONS

Confidentiality Agreement between Budd and Ford Motor Company, and facts surrounding disclosure to Ford Motor Company.
"Ford Focuses on New Low-Modulus Polyesters," by Al Wrigley, Metalworking News, p. 4, Jun. 11, 1990.
"Plastic Fenders An Emerging Market?, " by Mitra O'Malley, SAE Paper No. 900289, pp. 19-26.
"The Impact of Multi-Process Technology on Part and Process Consolidation and the Automobile Industry," by Christopher L. Clark, SAE Paper No. 900073, 35-39.
"A Lightweight, Multifunctional Plastic Reinforcement for Body Panels," by Masso Nakajima and Takeo Kobayashi, SAE Paper No. 900292, 53-61.
"An Overview of Automotive Plastic Bumpers," by Ken C. Rusch, SAE Paper No. 900420, pp. 69-77.

*Primary Examiner*—Paul R. Michl
*Assistant Examiner*—Edward J. Cain
*Attorney, Agent, or Firm*—Harness, Dickey & Pierce

[57] ABSTRACT

Molded articles prepared from flexible sheet molding compounds, and method of making the same. A flexibility modifying agent is incorporated into a thermoset resin composition (e.g. sheet molding compound) to improve the flexibility characteristics of the thermoset resin composition by lowering the flexural modulus. The thermoset resin composition also contains therein an isocyanate terminated urethane prepolymer; a thickening agent; a catalyst; a fibrous reinforcing material; and an inert filler.

24 Claims, No Drawings

FLEXIBLE SHEET MOLDING COMPOUND AND METHOD OF MAKING THE SAME

This is a division of U.S. patent application Ser. No. 555,924, filed Jul. 19, 1990, U.S. Pat. No. 5,100,935 entitled "Flexible Sheet Molding Compound and Method of Making the Same".

BACKGROUND OF THE INVENTION

1. Technical Field

The present invention relates to thermoset polyester resin-containing materials, and more particularly, relates to the employment of flexibility modifying agents in a polyester resin system to improve the aesthetic, surface and dynamic impact properties of the polyester resin system over existing polyester resin systems.

2. Background and Description of the Related Art

Polyester resin systems such as sheet molding compounds ("SMC") are popularly employed in many commercially important materials. Generally, these systems include a reinforcement material such as glass. The materials thus tend to be relatively rigid. While such rigidity often is desirable, in some instances it limits the practical utility of the material. For instance, SMC materials find popular application as exterior body panels for transportation vehicles, such as automobiles. At present SMC materials advantageously are employed as exterior horizontal body panels (e.g., roofs, hoods and deck lids) in the automotive industry. The rigidity of SMC, however, limits its usefulness as an exterior vertical body panel. Of course, by "exterior horizontal body panel", as used herein, is meant an exterior body panel that is generally disposed in a substantially horizontal position, relative to the ground, in an assembled vehicle. Likewise, by "exterior vertical body panel", as used herein, is meant an exterior body panel (such as a door, fender or a quarter panel) that is disposed in a generally vertical position relative to the ground, in an assembled vehicle. Accordingly, until the present invention, there has been a need for a sheet molding compound material that can be easily molded to form articles having good flexibility characteristics, good impact (e.g. stone-chip damage) resistance, relatively good strength with reduced levels of glass content, a commercially desirable specific gravity, good surface finish and good thermal expansion characteristics.

It has been suggested in the art to modify particular molding compounds using specific modifiers or combinations of modifiers to alter the characteristics of the molding compounds in one or more of the above ways. In this regard, various formulations are disclosed in U.S. Pat. Nos. 4,839,431, 4,808,361, 4,745,018, 4,534,888, 4,400,478, 4,329,438, 4,076,767 and 3,887,515, all of which are hereby incorporated by reference.

Other additives that may be employed in a plastic material are disclosed in U.S. Pat. No. 4,663,388, which is incorporated herein by reference.

SUMMARY OF THE INVENTION

In accordance with the composition, articles and method of the present invention, an improved sheet molding compound ("SMC") material is produced.

The composition and system of the present invention generally include:
(1) an unsaturated polyester resin;
(2) a flexibility modifying agent;
(3) an isocyanate terminated urethane prepolymer dual functional additive;
(4) a thickening agent;
(5) a linear oligomer;
(6) a catalyst;
(7) a mold release agent;
(8) a fibrous reinforcing material;
(9) an inert filler; and
(10) a phase stabilizing agent.

The present invention is predicated upon the discovery that certain materials (referred to herein as "flexibility modifying agents") can be added to a thermoset resin system (such as SMC) to enable a dramatic decrease in the glass content of the system and a decrease in the modulus of elasticity (i.e. flexural modulus) of the resulting system (e.g. to as low as about 550 ksi), while still exhibiting relatively good impact resistance, strength, and class A surface finish characteristics. When added in preselected proportions or concentrations, such flexibility modifying agents generally do not detrimentally affect the coefficient of thermal expansion of the system. In this manner it may be possible to reduce the amount of glass in the system, but still retain the thermal expansion characteristics of the resulting system so that it approximates that of steel or any other material that may be used as a structural support member in association with the resin system. Resulting modified SMC materials find increased potential for use in many applications heretofore impractical using SMC materials that are not modified according to the methods and compositions of the present invention.

Resin systems prepared according to the method and composition of the present invention also can be molded at substantially lower pressures than many resin systems prepared without the flexibility modifying agent. As a result, a dramatic savings in processing costs is also feasible.

DETAILED DESCRIPTION OF THE PREFERRED EMBODIMENT

"Flexibility modifying agent", as used herein, refers to an additive that when used in a resin system will result in a resin system that shows a significant and reproducible improvement in one or more of the mechanical or aesthetic properties of the resin system as compared to a resin system without a flexibility modifying agent. Examples of such properties include, without limitation, toughness, flexural modulus, and chip resistance. Materials modified using a flexibility modifying agent also exhibit good surface finish characteristics and a desirable specific gravity and thermal expansion coefficient.

The flexibility modifying agents of the present invention are preferably a polymer of the type including elastomeric or flexible polymers. For instance, it is contemplated that the preferred flexibility modifying agents include one or more polymers based on systems such as butadienes, polybutadienes, styrenes, polystyrenes, polyolefins (e.g. poly/ethylene/propylenes), styrene-butadienes, acrylonitriles, methacrylates (e.g. methyl methacrylate) or the like. More preferably, the polymer is one selected from the group consisting of polystyrene-polybutadiene-polystyrene ("S-B-S") polystyrene-polyisoprene-polystyrene ("S-I-S"), polystyrene-ethylene/butylene-polystyrene ("S-EB-S), and mixtures thereof. As can be appreciated such copolymers may be linear, branched, or may include varying ratios of both. However, in the present preferred embodiment, the S-B-S copolymer is linear, the S-I-S copolymer is branched, and the S-EB-S copolymer is branched. Such materials may be prepared according to known methods.

A highly preferred flexibility modifying agent includes a two-component admixture. The first component includes S-B-S admixed with S-I-S, wherein the first component is present in an amount of about 10 to about 40 percent by weight of the total admixture. The second component includes S-EB-S, present in an amount of about 60 to about 90 percent by weight of the total admixture.

Still more preferably, the first component is present in an amount of about 30 percent by weight of the total admixture. The second component is present in an amount of about 70 percent by weight of the total admixture.

Examples of commercially available materials suitable for use as flexibility modifying agents of the present invention include materials supplied by Shell Oil Company under the designation Kraton G1855X (styrene-butadiene rubber); Kraton D 1300 X (polystyrene-polybutadiene diblock and polystyrene-polybutadiene-polystyrene triblock); and Kraton MG 1701 X (polystyrene ethylene/propylene diblock). Mixtures of the above may also be employed (e.g. 50:50 mixture of MG 1701 X and D 1300 X).

Suitable materials supplied by Kaneka Corporation may include varying amounts of methyl methacrylate-butadiene-styrene. Examples of these materials include those supplied under the designations Kane Ace B-56 impact modifier (70% butadiene); 52T264; MOD II (which generally has a high rubber content); and X52 NO2X (which generally has a high styrene content).

ATOCHEM supplies suitable materials for use as a flexibility modifying agent. Examples include R-45HT (polybutadiene); R-45HM; CN 15 (acrylonitrile copolymer); and CS 15 (styrene butadiene rubber).

Yet another suitable commercially available material includes that supplied by B. F. Goodrich under the designation HyCar 1300X 40 (epoxy terminated butadiene acrylonitrile).

Additional examples of materials (and methods of making the same) that may be used as flexibility modifying agents in the present method and composition are discussed in U.S. Pat. No. 4,400,478 issued Aug. 23, 1983 (Gergen et al), which is hereby expressly incorporated by reference.

In general, to achieve the desired resulting characteristics in the resin systems of the present invention, it is preferred that the polymer of the flexibility modifying agent has an average molecular weight (measured while as a raw material in a generally undissolved state) between about $100 \times 10^6$ and about $150 \times 10^6$, and a viscosity (assuming that the flexibility modifying agent is dissolved to about 35% by weight solids of flexibility modifying agent in an organic monomeric solvent such as styrene) of about 1000 cps to about 2400 cps at about 25° C. Further, in a preferred embodiment, (as measured in its generally undissolved or raw state) the polymer is present in an amount of about 3 to about 20 percent by weight of the final or overall composition of the final sheet molding compound. More preferably, the flexibility modifying agent is present in an amount of about 3 to about 8 percent by weight of the final composition, and still more preferably, it is present in an amount of about six percent by weight of the final composition. It should be appreciated, however, that such polymer may be employed in higher or lower concentrations, depending upon the particular application. It is also possible that the polymer may selectively be employed in a resulting material to modify the properties of the material in predetermined locations in the material. Unless otherwise stated (such as by reference to the material in its undissolved or raw state), the weight percentages of the flexibility modifying agent, which are discussed herein, reflect the weight percentage occupied by the entire solution of the flexibility modifying agent dissolved in an organic monomer solvent, such as styrene, at about 35% solids of flexibility modifying agent.

As mentioned previously, the flexibility modifying agents of the present invention are employed in thermosetting polyester resins aimed at SMC applications. It is preferred that those systems typically employ an unsaturated polyester resin as a base material. Thus, the unsaturated polyester resin typically occupies the balance of the remaining material after all constituents are added to the SMC. Generally, the unsaturated polyester will occupy about 5 to about 50 percent by weight of the final composition, and more preferably, about 10 to about 30 percent by weight of the final composition. Still more preferably the unsaturated polyester resin is present at a level of about 20 percent by weight of the final composition.

Preferred systems for use in the present invention are described in U.S. Pat. Nos. 4,067,845 and 4,260,538, both expressly incorporated herein by reference. For instance, U.S. Pat. No. 4,067,845 describes an unsaturated polyester resin system (and method of making the same) and other components of SMC suitable for use in the instant invention. Particularly preferred systems are described in U.S. Pat. No. 4,535,110, "Dual Functional Additive", Iseler, Kenneth A., et al, and assigned to The Budd Company, Troy, Mich., also incorporated herein by reference. Such a system employs an isocyanate terminated urethane polymer composition as a dual functional additive.

Another preferred system is described in U.S. Pat. No. 4,622,354, Iseler, Kenneth A., et al, and assigned to The Budd Company, Troy, Mich., also incorporated herein by reference. Such a system generally employs the system of U.S. Pat. No. 4,535,110, further modified by a phase-stabilizing agent.

A particularly preferred composition of the present invention includes the following components:
(A) an unsaturated polyester resin having (1) a ratio of hydroxyl groups to carboxyl groups of between 5.7 and 0.8, (2) an acid number of at least 14, and (3) an average molecular weight between about 800 and 5,000;
(B) a flexibility modifying agent (which preferably has been dissolved in an organic monomeric solvent);
(C) an isocyanate terminated urethane prepolymer composition having an equivalent ratio of NCO to OH from about 1.2/1 to about 5/1, comprising a polyol and a di- or polyisocyanate, and being prepared by reacting (1) one equivalent weight of a polyol having an average molecular weight of about 600 to 4,000 and an average functionality of approximately 2 to approximately 6; and (2) 1.2 to 5 equivalent weights of a di- or polyisocyanate selected from the group consisting of 80:20 or 65:35 isomer mixture of the 2,4- and 2,6-isomeric forms of toluene di-isocyanate, ethylene di-isocyanate, propylene di-isocyanate, meta- and para-phenyl di-isocyanate, 4,4'-diphenyl methane di-isocyanate (MDI) or a mixture of MDI and its trifunctional cyclic adduct products containing carbodiimide linkages, 1,5-naphthalene di-isocyanate, para- and meta-xylene di-isocyanates, alkylene di-isocyanates, or polymeric MDI containing an average of two isocyanate groups per molecule, toluene di-isocyanate, polyisocyanate prepolymers of aromatic type, toluene di-isocyanate based adducts, aromatic/aliphatic polyisocyanates and polyfunctional aliphatic isocyanates; wherein said reactants combine in a one-step addition process to yield an isocyanate terminated urethane prepolymer of controlled molecular weight to impart improved low shrink, dynamic impact strength and molding characteristics as measured by viscosity index properties in thermoset polyester resin products, and particularly sheet molding compositions (SMC) by covalently bonding to the polyester resin matrix of SMC;

(D) a thickening agent including a metallic oxide or hydroxide selected from Group IIA of the periodic table and consisting of calcium and magnesium oxides or hydroxides in an amount to react with at least 30 percent, but not more than 75 percent of the carboxyl groups present;

(E) a linear oligomer having a molecular weight in the range of about 400 to about 200,000 and preferably about 10,000 to about 90,000;

(F) a free radical polymerization catalyst;

(G) a mold release agent;

(H) a fibrous reinforcing material;

(I) an inert filler; and (J) a phase-stabilizing agent selected from the group consisting of $C_5$–$C_{28}$ fatty acids, $C_{20}$–$C_{54}$ dimer or trimer acids, polyester polyols having an average molecular weight of about 200 to about 6,500, or mixtures thereof.

It has been found, however, that an unexpected improvement in the properties of the resulting SMC can also be accomplished by using the flexibility modifying agent even if one or more of the above components is omitted. For example, commercially useful materials can be prepared using components such as the above with the omission of, or substantially minor amounts of, a mold release agent. This provides a commercial advantage in that, at higher levels, many mold release agents are known to impair the subsequent step of coating articles made from SMC. Likewise, it is also possible that the composition of the present invention may omit the phase stabilizing agent, the linear oligomer, the dual functional additive (i.e. the isocyanate terminated urethane prepolymer) or all of them.

As will be more particularly discussed herein, the use of the present flexibility modifying agents also makes it possible to achieve high quality, high integrity molded parts using the above composition with several of the constituents being employed at levels different than their conventional or art-disclosed levels. For instance, glass and filler proportions could differ from conventional levels.

When employed in the sheet molding compounds described herein, the flexibility-modifying agent is blended in any conventional manner into the portion which contains the polyester resin. Preferably it is heated slightly during blending to a temperature in the range of about 100° F. to about 110° F., and more preferably to a temperature of about 105° F. Such blending step should last for about 10 to about 15 minutes. If flexibility modifying agent is not provided in solution (such as many commercially available materials), it may be diluted or premixed with an organic monomeric solvent (at a level, for example of about 30 to about 40 percent by weight solids, and preferably at about 35 percent by weight solids) such as an ethylenically unsaturated monomer (e.g. styrene or the like). Then, preferably it is allowed to sit for at least 24 hours.

The flexibility modifying agent (as dissolved in organic monomeric solvent) is ordinarily employed at a level of about 40 to about 90 percent by weight of the unsaturated polyester resin. More preferably, the flexibility-modifying agent is employed at a level of about 43 to about 86, and still more preferably about 65 to about 75 percent by weight of the unsaturated polyester resin. Of course, as discussed more fully herein, in some instances where less flexibility is desired, and where polyvinyl acetate is employed, the amount of flexibility modifying agent will tend to be toward the lower ends of the above ranges. Further, as discussed herein, where ranges are given as "percent by weight of the unsaturated polyester resin" (or the like) is meant that the material discussed occupies the stated percentage of the total amount of the unsaturated polyester used. For instance, for the above flexibility modifying agent, this would mean (for the broadest range) that for every 100 grams of unsaturated polyester resin there is about 40 to about 90 grams of flexibility modifying agent.

The useful isocyanate terminated urethane prepolymers are based upon a polyether or polyester polyol, or a mixture thereof, and preferably a polyether polyol, and a di-isocyanate or polyisocyanate. The polyol used in the prepolymer is preferably a diol or triol having a molecular weight of approximately 600 to approximately 4,000 and preferably about 2,000, as exemplified by BASF's Pluracol P-2010, and a functionality of approximately 2 to approximately 6, preferably 2 to 3 and more preferably 2. The dual functional additive is formed in a one-step addition reaction between one equivalent weight of the polyol as described above and two equivalent weights of the polyisocyanate. Preferably, the reaction occurs in the presence of approximately 0-1% of a conventional urethane catalyst such as stannous octoate, dibutyltin dilaurate, and the like. The amount of such catalyst is determined according to the total weight of the urethane.

The isocyanate terminated urethane additive thus formed should have an isocyanate to hydroxyl ratio NCO/OH of about 1.2/1 to about 5/1, and preferably NCO/OH between about 1.2/1 to about 3/1, and most preferably about 1.33/1.

The isocyanate terminated urethane prepolymer is prepared by first reacting an organic polyisocyanate, and preferably a di-isocyanate with a polyol, using standard procedures to yield an isocyanate terminated prepolymer of controlled molecular weight and having an NCO/OH ratio of about 1.2/1 to about 5/1, and preferably NCO/OH between about 1.2/1 to about 3/1, and most preferably 1.33/1.

The polyisocyanates used in the formation of the present invention include toluene di-isocyanate, such as the 80:20 or 65:35 isomer mixture of the 2,4- and 2,6 isomeric forms, ethylene di-isocyanate, propylene di-isocyanate, meta- and para-phenyl di-isocyanates, 4,4'-diphenyl methane di-isocyanate (MDI) or a mixture of MDI and its trifunctional cyclic adduct products containing carbodiimide linkages, 1,5 naphthalene di-isocyanate, para- and meta-xylene di-isocyantes, alkylene di-isocyanates such as tetra-methylene di-isocyanate and hexamethylene di-isocyanate, 2,4- and 2,6 di-isocyanate methylcyclohexane, dicyclohexylmethane di-isocyanate, and polymeric MDI containing an average of about two isocyanate groups per molecule. Other polyisocyanates which may be employed include polyisocyanate of toluene di-isocyanate, polyisocyanate prepolymers of aromatic type, toluene di-isocyanates based adducts, aromatic/aliphatic polyisocyanates and polyfunctional aliphatic isocyanate. The exact polyisocyanate employed is not critical, but di-isocyanates are preferred, and of these, 4,4'diphenyl methane di-isocyanate (MDI) or a mixture of MDI and its trifunctional cyclic adduct products containing carbodiimide linkages are preferred. It should be noted that differing results in respect to low shrinkage additives will be obtained by the use of different polyisocyanates and it is emphasized that di-isocyanates are preferred.

The polyol reactant used in the dual functional additive is selected from either a polyester polyol or polyether polyol, preferably polyether polyols and mixtures of two or more such polyether polyol compounds. The polyol reactant, or mixture thereof, used has an average equivalent weight of between 600 to 4,000 and a functionality of between 2 and 6, and preferably 2 and 3 and more preferably 2.

Among suitable polyether polyols, it is contemplated that polyoxyalkylene polyols and mixtures thereof may be used. These can be prepared according to well known methods, such as by condensing an alkylene oxide, or mixture of alkylene oxides using random or stepwise addition, with a polyhydric initiator of a mixture of polyhydric initiators.

The alkylene oxides contemplated for use in the prepolymer include ethylene oxides, propylene oxide, butylene oxides, amylene oxide, aralkylene oxides, such as trichlorobultylene oxide and such, and the most preferred alkylene oxide is propylene oxide or a mixture thereof with ethylene oxide using random or stepwise oxyalkylation.

Polyhydric initiators used in preparing the prepolymer polyether polyol reactant include (a) aliphatic diols such as ethylene glycol, 1,3-propylene glycol, 1,2-propylene glycol, butylene glycols, butane diols, pentane diols and the like, (b) the aliphatic triols such as glycerol, trimethylolpropane, triethytlolpropane, trimethylolhexane and the like, (c) the polyamines such as tetraethylene diamine and (d) the alkanolamines such as diethanolamine, triethanolamine, and the like. Preferably, the polyhydric initiators of choice for use in preparing the polyether polyol reactant is an aliphatic diol or triol such as ethylene glycol, propylene glycol, glycerol, trimethylolpropane, and the like.

If a polyester polyol is selected for use as the polyol reactant of the dual functional additive, such a polyol is usually formed by reacting a polycarboxylic acid with a polyhydric initiator, such as a diol or triol. The polycarboxylic acids include oxalic, malonic, succinic, glutaric, adipic, pimelic, suberic, azelaic acid, and the like. Illustrative polyhydric alcohols include various diols and triols and higher functionality alcohols such as ethylene glycol, 1,3-propylene glycol, 1,2-propylene glycol, butylene glycols, butane diols, pentane diols, glycerol, trimethylolpropane, trimethylolhexane, hexane 1,2,6-triol and the like.

When a polyether polyol reactant is to be created by the alkylene oxide polyhydric initiator reaction, usually a catalyst, such as the art-disclosed catalyst KOH, is added to speed up the reaction. The resulting polyether polyol should have an average molecular weight of approximately 600 to 4,000. After reaction, the catalyst is preferably removed, leaving a polyether polyol suitable for reaction with the polyisocyanate reactants as discussed above to form the isocyanate terminated urethane prepolymer of the present invention.

In forming the isocyanate terminated urethane prepolymer, one equivalent weight of the polyol reactant as defined above is reacted with 1.2 to about 5, more preferably about 1.2 to about 3, and still more preferably about 1.3 equivalent weights of a polyisocyanate as defined previously in the presence of any conventional urethane catalysts such as stannous octoate, dibutyltin dilaurate and the like, whereby the isocyanate groups are placed on the terminal ends of the prepolymer, thereby yielding the isocyanate terminated urethane prepolymer. It should be noted that the prepolymer may be made in the presence of a monomer or a monomer may be added to or dissolved in the monomer after it has been made, without adversely affecting its function as a low profile additive and as a viscosity index modifier to impart the desired advantages.

Moreover, regardless of whether or not the prepolymer is used with a conventional low shrink additive, the ratio of the total amount of isocyanate terminated urethane prepolymer to polyester resin should preferably be within the range of approximately 10 parts by weight of prepolymer to about 100 parts by weight of polyester resin, to approximately 30 parts by weight of prepolymer to about 100 parts by weight of polyester resin. More preferably, the ratio should be approximately 12 parts by weight of prepolymer to about 100 parts by weight of polyester resin, to approximately 20 parts by weight of prepolymer to 100 parts by weight of polyester resin. Still more preferably the ratio should be about 17 parts by weight of prepolymer to about 100 parts by weight of polyester resin. In a highly preferred embodiment, the concentration of isocyanate terminated urethane prepolymer will be about 3 to about 4 percent by weight of the final composition.

When used in an SMC as defined previously, the isocyanate terminated urethane prepolymer may be dissolved in styrene and then used like any other low shrink additive. Preferably, the isocyanate terminated urethane prepolymer is employed in an amount sufficient to react with at least 10 percent but not more than 105 percent of the hydroxyl groups present in the reaction.

Although the prepolymer may be used alone, it may also be used with a monomer from the group styrene, vinyl toluene and vinyl acetate and any other ethylenically unsaturated monomer. When so used, the prepolymer is ordinarily present in an amount to give 0.5 to 3.5 moles of monomer unsaturation per mole of unsaturation in the unsaturated polyester resin. Styrene and vinyl toluene are preferred monomers, although others may be used.

In employing the dual functional additive described herein with thermoset polyester resin products, and especially sheet molding compositions (SMC), the unsaturated polyester resin such as that described in U.S. Pat. No. 4,067,845 (Epel et al) may be dissolved in a monomer such as styrene, vinyl acetate or vinyl toluene. It should be noted, however, that unexpected advantageous results are possible by avoiding or omitting the step of dissolving the thermoset polyester resin in the monomer. Thus, in a highly preferred embodiment, such unsaturated polyester resin is not dissolved in the monomer. The dual thickening system of Epel et al may be modified by the replacement of the organic polyisocyanate defined therein with the dual functional additive described above. A heat-activated free radical catalyst, preferably a peroxide (such as an organoperoxide, hydroperoxide), or azo compound, may also be added to the polyester resin material.

The prepolymer may also be employed with a thickening agent, such as a metallic oxide or hydroxide, as part of a dual thickening system. The metallic oxide or hydroxide used in the dual thickening system is essentially a metal oxide or hydroxide from the Group IIA on the periodic table and comprises calcium or magnesium. Although calcium may be used in its various oxides and hydroxides, the magnesium is preferred inasmuch as superior results are achieved by the use of magnesium. The amount of the metallic oxide or hydroxide employed is preferably about 0 to about 2 percent by weight of the final composition. More preferably, the thickening agent is magnesium hydroxide and is present at a level of about 1 percent by weight of the final composition.

The isocyanate terminated urethane prepolymer additive may optionally be used with any of the conventional linear oligomers or low shrink additives of the prior art, such as polyvinyl acetate and polymethyl methacrylate (or other acrylic-type material) or a mixture thereof, or any other linear oligomer having a molecular weight within the range of approximately 400 to about 200,000, and preferably about 10,000 to approximately 90,000. Preferably, when employed, the linear oligomer is present at a level of about 1 to about 10 percent by weight of the overall composition, and more preferably at about 3 to about 8 percent by weight of the overall composition. In a still more preferred composition, the linear oligomer is present at about 4 percent by weight of the overall composition.

A specific example of a preferred linear oligomer is polyvinyl acetate. It has been discovered that, when used in addition to an acrylic-type oligomer the polyvinyl acetate unexpectedly improves SMC surface finish quality and allows tailoring of SMC flexibility (such as by increasing rigidity of the final material where it is so desired). As previously alluded to, the amount of polyvinyl acetate employed typically depends on the amount of flexibility modifying agent employed. Generally, the higher amount of flexibility modifying agent employed, the lesser amount of polyvinyl acetate is employed. A preferred amount of polyvinyl acetate ranges from about 0 to about 5 percent of the final composition. More preferably, when employed, the polyvinyl acetate is present at a level of about 3 percent by weight of the final composition. At that level, a preferred amount of flexibility modifying agent would be about 4.5 percent by weight of the overall composition (as measured in its generally undissolved or raw state).

In a preferred embodiment, a free radical polymerization catalyst is also employed in the present invention. The catalyst is preferably present in an amount of 1.0 part per 100 parts of total resin and monomer, the parts being measured by weight. The free radical polymerization catalyst is added to the uncured composition so that upon heating to the activation temperature, the additive type cross-linking polymerization reaction will commence between the polymerizable monomer and the unsaturated polyester resin. The catalyst is usually employed in the amount in the range of about 0.1 to 3.0 parts per 100 parts of the total monomer and resin.

Although any suitable free radical polymerization catalyst may be employed, a preferred catalyst is a peroxide catalyst. Examples of alternative catalysts include peroxyester, oligomeric benzo pinacol silylether, peroxyketal, organotin, alkyl peroxide, azonitrile or the like.

When employed, the mold release agent useful in the present invention may be any known mold release agent such as zinc stearate, calcium stearate, magnesium stearate, organic phosphate esters and other organic liquid internal mold release agents. The mold release agent may be employed at its art-disclosed level.

The reinforcing fibers generally are present in SMC in an amount of about 10 to 80 weight percent of the overall composition. Preferably the reinforcing fibers are made of a fiberglass material such as E-glass. A preferred range for the reinforcing fiber is approximately 15 to 25 weight percent by weight of the final composition. Still more preferably, the reinforcing fiber is present in an amount of approximately 18 to about 24 weight percent by weight of the final composition. Even still more preferably, the reinforcing fiber is present in an amount of about 20 to about 22 percent by weight of the final composition.

Any number of conventional nonreinforcing fillers may be added to the composition to reduce overall material costs without sacrificing a significant degree of the desirable physical properties in the final product, or may be added to impart specific properties to the uncured compound. For instance, fillers may be used in an amount ranging from about 20 parts to 1,000 parts by weight per 100 parts of the pure polyester resin in the thermoset polyester resin applications, such as an SMC. More preferably, the filler is used in an amount ranging from about 40 parts to about 80 parts by weight per 100 parts of the pure polyester resin. In this manner it is possible to achieve a significant and reproducible improvement in one elongation or more characteristics of the resulting material.

In a highly preferred embodiment, the filler is calcium carbonate which is present in an amount of about 32.8 percent by weight of the final composition. An example of an alternative or supplemental preferred filler includes silica spheres.

In another preferred embodiment, the above described compositions further include a phase stabilizing agent such as those described in U.S. Pat. No. 4,622,354 (which is hereby expressly incorporated by reference).

In general, the phase-stabilizing agents or additives contemplated for use in the present invention are selected from the group consisting of fatty acids, dimer acids, trimer acids, polyester polyols, and mixtures thereof.

The preferred fatty acids include $C_5$–$C_{28}$ saturated and unsaturated fatty acids. The preferred dimer and trimer acids include $C_{20}$ to $C_{54}$ acids. The preferred polyester polyols have an average molecular weight of about 200 to about 6,500; additionally, the polyol materials preferably posses an average functionality of about 2 to about 4.

More particularly, the fatty acids useful in the present invention are the $C_5$ to $C_{28}$ saturated and unsaturated, branched or straight chain, fatty acids. Preferred materials include lauric, palmitic, stearic, oleic, linoleic, linolenic, caproic, caprylic, capric, myristic, palmitoleic acid, cerotic, cetoleic, and mixtures thereof. Highly preferred materials include lauric, palmitic, stearic, oleic, linoleic, linolenic acids, and mixtures thereof. In a highly preferred embodiment, a mixture of stearic and oleic acids is employed. These materials are items of commerce and are generally obtained by extraction from beef tallow, coconut oil, corn oil, cottonseed oil, olive oil, palm oil, palm kernel oil, and the like.

The preferred dimer and trimer acids useful in the practice of the present invention are the $C_{30}$–$C_{54}$ materials, i.e. those containing about 30 to about 54 carbon atoms. These are generally dibasic acids. They may be joined at the nonfunctional end or, in the case of dimerization of any two unsaturated acid molecules, may be joined at the middle (unsaturated) positions. Mixtures of such material may also be employed.

Particularly preferred are dimer or trimer acids prepared from the monomeric materials recited above, i.e., dimer acids prepared by the union of at least two (and in the case of trimer acids-three) acid moeities selected from lauric, palmitic, stearic, oleic, linoleic, linolenic, caproic, caprylic, capric, myristic, and palmitoleic acids. Even more preferred are the dimer acids having about 36 carbon atoms, i.e., prepared by the union of two or more $C_{18}$ fatty acids and trimer acids having about 54 carbon atoms.

The third class of phase stabilization additives or agents useful in the practice of the present invention are polyester polyols; mixtures of polyester polyols may also be employed. The preferred polyols, or mixtures of polyols, have an average molecular weight in the range of about 200 to about 6,500. More preferably, the polyol employed has an average molecular weight of about 300 to about 5,000, and still more preferably about 400 to about 4,500, and still more preferably about 600 to about 4,000. In a highly preferred embodiment, the polyol employed has an average molecular weight of about 1,000 to about 3,000.

The polyols preferred for use in the practice of the present invention possess an average functionality of about 2 to about 4, and preferably about 2 to about 3.

When employed in the method and composition of the present invention, the phase stabilizing agent is present at a level of about 0.1 to about 1.3 percent by weight of the overall composition. More preferably, the phase stabilizing agent is present at a level of about 0.5 to about 1.0 percent by weight of the overall composition. Still more preferably, it is present in an amount of about 0.8 percent by weight of the overall composition.

When employed in the sheet molding compounds described herein, the phase-stabilizing agent or additive is blended in any conventional manner into the portion which contains the polyester resin. If this material is liquid, it may be premixed with an organic monomeric solvent such as an ethylenically unsaturated monomer selected from the group consisting of styrene, vinyl toluene, or vinyl acetate. It is ordinarily employed at a level of a about 0.25 to about 20 percent by weight of the unsaturated polyester resin. More preferably, the phase-stabilizing agent or additive is employed at a level of about 1.0 to about 8, and still more preferably about 1 to about 7 percent by weight of unsaturated polyester resin. In a highly preferred embodiment, the phase-stabilizing agent or additive is employed at a level of about 1.0 to about 5.8 percent by weight of unsaturated polyester resin and more preferably about 3.8 percent by weight of unsaturated polyester resin.

The agents of additives described herein are useful in the phase stabilization of thermoset polyester resin systems, including the present systems including a flexibility modifying agent. That is, in general, thermosetting polyester resin systems, particularly for sheet molding applications, have at least two distinct phases as a result of the diverse nature and character of the polyester resin component and the other components, as well as necessary monomers or carriers. In the maturation and molding process the various components have a tendency to separate. As a result, many advanced SMC matrices employ a low profile additive to retard or prevent shrinkage of the molded part. The polyester resin and the low profile additive are generally present prior to the molding process-in two finely dispersed phases. During the maturation or molding process, the low profile agent prevents shrinkage by micro-phase separation; thus, micro-phase separation is acceptable. It is this micro-phase separation that provides the low-shrink action. However, if gross phase separation is allowed during the maturation process, such separation would result in surface flaws and imperfections which are unacceptable. This problem is especially critical in producing a Class A quality surface finish. Reducing or preventing gross phase separation is therefore highly desirable in such operations. Such reduction or prevention may be facilitated by using the instant phase stabilizing additives or agent.

In general, the SMCs of the present invention are prepared by mixing, blending, or otherwise contacting the components together. It has been discovered that improved results are achievable if the composition is prepared according to the following steps. While the invention is described in connection with a preferred sequence of steps, the skilled artisan will appreciate that such sequence may be varied or modified to achieve substantially the same results.

First, the unsaturated polyester resin is provided. The polyester resin typically is provided with the ethylenically unsaturated monomer already therein. To the unsaturated polyester resin, the catalyst and the phase stabilizing agent are added. These materials are then blended to form an admixture.

While the admixture is being blended, the following components are added in the sequence as listed:
(1) mold release agent;
(2) filler; and
(3) flexibility modifying agent (which preferably has been dissolved in an organic monomeric solvent).

The resulting admixture is continuously blended until the admixture reaches a temperature of at least about 100° F.

To the admixture the linear oligomer is added substantially contemporaneously with the thickening agent. Then, the isocyanate terminated urethane prepolymer is added.

All of the above materials are continuously blended until substantially all of the flexibility modifying agent is disbursed substantially throughout the admixture. Typically this will require the resulting admixture to reach a temperature of at least about 105° F.

Preferably, the material is then mixed with the fibrous reinforcing material in a conventional manner, and formed into a sheet. The sheet is then matured or B-staged to a moldable consistency by aging at about 90° to about 104° F. for about 1 to 5 days, and is more preferably is B-staged at about 92° F. for about one to about 5 days. Preferably the viscosity of the material is about 15 to about $20 \times 10^6$ cps at 92° F. After B-staging has occurred, the SMC may be stored for long periods of time without jeopardizing either its handleability or processability. The sheet also then can be cut into an appropriate size and shape for molding (i.e. it can be made into a charge). The material also can be molded.

The method and composition of the present invention are useful for preparing a number of articles, and are not necessarily limited to the automotive-related applications discussed herein.

In a highly preferred embodiment, the present method and composition is employed to fabricate exterior body panels (vertical and horizontal) for transportation vehicles, such as automobiles.

To manufacture the present exterior automotive body panels, a charge of uncured SMC material (i.e. a mass of uncured SMC material), is compression molded. Any method of compressing molding may be employed. However, it is preferred that compression molding is accomplished using teachings of U.S. Pat. Nos. 4,612,149, 4,855,097 and 4,867,924, all of which are assigned to The Budd Company and are hereby expressly incorporated by reference. Although not necessary under all conditions, preferably such compression molding is performed using a vacuum.

In general, the compression molding method of the instant invention includes the steps of:
(1) placing a charge of SMC on a molding surface located within a mold;
(2) partially closing the mold;
(3) evacuating a mold cavity defined in the mold;
(4) closing the mold to compress the charge and cause it to fill the mold cavity and form a molded part;
(5) curing the resin in the charge; and
(6) removing the molded part.

Preferably the mold will include at least one die having a molding surface substantially defining the ultimate desired configuration of the molded part. Further examples of suitable compression molding apparatus may be found in U.S. Pat. Nos. 4,488,862 and 4,551,085 (both assigned to The Budd Company), which are hereby expressly incorporated by reference. More preferably, the mold will include a first die and a second die (e.g. male and female dies) which, when brought towards each other in a generally mating relationship, define the mold cavity. Preferably, both the first die and the second die have a molding surface. During molding, preferably the dies of mold are heated so as to maintain the charge at a predetermined temperature sufficient to promote curing of the resin in the charge. By way of example, in a present preferred embodiment, the mold is heated to a temperature in the range of about 285° F. to about 320° F., and more preferably at about 300° F.

The mold is partially closed (e.g. so that a distance of about several inches exists between the dies). Preferably the mold cavity is evacuated so that substantially no air is trapped as the SMC cures in the mold. Thus, it is evacuated to a pressure of about 24 inches Hg. In some instances lower or higher pressures may also be possible.

While the mold cavity is evacuated, the mold is closed (i.e., the dies are brought closer together), and the molding surfaces of the dies are brought in contact with the charge under a pressure of about 75 psi to about 300 psi, more preferably about 90 psi to about 220 psi, and still more preferably as low as about 110 psi. Higher pressures, of course, may be employed. This pressure is maintained while the resin in the charge material cures. Thus, for a part having a thickness of about 90 mils, pressure is maintained for a time sufficient to allow the resin in the sheet molding compound to cure, and preferably is maintained for about 1 to about 3 minutes. When the mold is in the closed position it may be returned to atmospheric pressure. The resin of the charge material is allowed to cure, after which the mold may be opened and the part removed. Of course it will be appreciated that the molding conditions (e.g. times, temperatures, and pressures) will vary depending on factors such as the specific configuration and thickness of the part being molded.

It should be noted, as suggested in the above-mentioned Budd Company compression molding patents, it is preferable that when using a mold with a first die and a second die to place the sheet molding compound charge on the molding surface of one the dies so that the charge covers 40%–80% of the surface area of the molding surface of that die.

The following is given by way of example only, and is not intended in any way to be a limitation on the scope or spirit of the present invention as discussed or claimed.

EXAMPLE

| Ingredient | Composition (1) Parts by Weight | Composition (2) Parts by Weight |
|---|---|---|
| Unsaturated polyester | 20.7 | 11.0 |
| styrene monomer | — | 0.4 |
| calcium carbonate | 34.9 | 46.0 |
| catalyst | 0.1 | 1.0 |
| mold release agent (zinc stearate) | 0.3 | 0.3 |
| dual functional additive | 3.3 | 1.8 |
| phase stabilizing agent | 0.7 | 0.5 |
| linear oligomer (acrylic-type) | 1.0 | 8.2 |
| magnesium hydroxide | 1.0 | 2.1 |
| low shrink additive | — | 1.0 |
| flexibility modifying agent (dissolved in styrene to 35% solids) | 16.0 | — |
| fiberglass | 22.0 | 27.5 |
| modifier | — | 0.2 |

Both of the above compositions exhibit class A surface quality finish and the following properties:

| | Composition (1) | Composition (2) |
|---|---|---|
| coefficient of thermal expansion | $6.9 \times 10^{-6}$ to $7.2 \times 10^{-6}$ in/in/°F. | $6.7 \times 10^{-6}$ to $7.2 \times 10^{-6}$ in/in/°F. |
| tensile strength | 9,500 psi | 10,200 psi |
| flexural modulus | 650,000 psi | 1,600,000 psi |
| specific gravity | 1.5 | 1.9 |

Although the invention has been described with particular reference to certain preferred embodiments thereof, variations and modifications can be effected within the spirit and scope of the following claims.

What is claimed is:

1. A sheet molding compound exhibiting improved flexibility characteristics, comprising:
    (a) an unsaturated polyester resin having (1) a ratio of hydroxyl groups to carboxyl groups of between 5.7 and 0.8, and (2) an acid number of at least 14, and (3) an average molecular weight between about 800 and 5,000;
    (b) a flexibility modifying agent dissolved in an organic monomeric solvent;
    (c) an isocyanate terminated urethane prepolymer composition having an equivalent ratio of NCO to OH from about 1.2/1 to about 5/1, comprising a polyol and a di- or polyisocyanate, and being prepared by reacting (1) one equivalent weight of a polyol having an average molecular weight of about 600 to 4,000 and an average functionality of approximately 2 to approximately 6; and (2) 1.2 to 5 equivalent weights of a di- or polyisocyanate selected from the group consisting of 80:20 or 65:35 isomer mixture of the 2,4- and 2,6-isomeric forms of toluene di-isocyanate, ethylene di-isocyanate, propylene di-isocyanate, meta-and para-phenyl di-isocyanate, 4,4'-diphenyl methane di-isocyanate (MDI) or a mixture of MDI and its trifunctional cyclic adduct products containing carbodiimide linkages, 1,5-naphthalene di-isocyanate, para- and metaxylene di-isocyanates, alkylene di-isocyanates, or polymeric MDI containing an average of two isocyanate groups per molecule, toluene di-isocyanate, polyisocyanate prepolymers of aromatic type, toluene di-isocyanate based adducts, aromatic/aliphatic polyisocyanates and polyfunctional aliphatic isocyanates; wherein said reactants combine in a one-step addition process to yield an isocyanate terminated urethane prepolymer of controlled molecular weight to impart improved low shrink, dynamic impact strength and molding characteristics as measured by viscosity index properties in thermoset polyester resin products, and particularly sheet molding compositions (SMC) by covalently bonding to the polyester resin matrix of SMC;

(d) a thickening agent including a metallic oxide or hydroxide selected from Group IIA of the periodic table and consisting of calcium and magnesium oxides or hydroxides in an amount to react with at least 30 percent, but not more than 75 percent of the carboxyl groups present;

(e) a free radical polymerization catalyst;

(f) a fibrous reinforcing material; and (g) an inert filler.

2. A composition according to claim 1, further comprising a phase-stabilizing agent selected from the group consisting of $C_5$–$C_{28}$ fatty acids, $C_{20}$–$C_{54}$ dimer or trimer acids, polyester polyols having an average molecular weight of about 200 to about 6,500, or mixtures thereof.

3. A composition according to claim 1, further comprising a mold release agent.

4. A composition according to claim 1, further comprising a linear oligomer having a molecular weight in the range of about 400 to about 200,000, and preferably about 10,000 to about 90,000.

5. A composition according to claim 1, wherein the flexibility modifying agent is selected from the group consisting of polystyrene-polybutadiene-polystyrene, polystyrene-polyisoprene-polystyrene, polystyrene-ethylene/butylene-polystyrene and mixtures thereof.

6. A composition according to claim 1, wherein said flexibility modifying agent is present in its raw state in an amount of about 3 to about 20 precent by weight of the final composition.

7. A composition according to claim 1, wherein said fibrous reinforcing material is present in an amount of about 15 to about 25 percent by weight of the overall composition.

8. A sheet molding compound for making exterior body panels for vehicles which exhibit increased flexibility, said sheet molding compound comprising:

(a) a thermosetting resin including an unsaturated polyester resin having (1) a ratio of hydroxyl groups to carboxyl groups of between 5.7 and 0.8, and (2) an acid number of at least 14, and (3) an average molecular weight between about 800 and 5,000;

(b) a thickening agent;

(c) a polymerization catalyst;

(d) fibrous reinforcing material;

(e) a phase stabilizing agent;

(f) an inert filler;

(g) a low shrink additive; and (h) a flexibility modifying agent, dissolved in an organic monomer solvent, in sufficient quantity to provide the panel with a decrease in flexural modulus to reduce stone-chip damage while maintaining other characteristics suitable for use in an assembled vehicle.

9. The sheet-molding compound according to claim 8 further comprising an isocyanate terminated urethane prepolymer.

10. The sheet-molding compound of claim 9 wherein said isocyanate terminated urethane prepolymer composition is an isocyanate terminated urethane prepolymer composition having an equivalent ratio of NCO to OH from about 1.2/1 to about 5/1, comprising a polyol and a di- or polyisocyanate, and being prepared by reacting (1) one equivalent weight of a polyol having an average molecular weight of about 600 to 4,000 and an average functionality of approximately 2 to approximately 6; and (2) 1.2 to 5 equivalent weights of a di- or polyisocyanate selected from the group consisting of 80:20 or 65:35 isomer mixture of the 2,4- and 2,6-isomeric forms of toluene di-isocyanate, ethylene di-isocyanate, propylene di-isocyanate, meta-and paraphenyl di-isocyanate, 4,4'-diphenyl methane di-isocyanate (MDI) or a mixture of MDI and its trifunctional cyclic adduct products containing carbodiimide linkages, 1,5-naphthalene di-isocyanate, para- and metalxylene di-isocyanates, alkylene di-isocyanates, or polymeric MDI containing an average of two isocyanate groups per molecule, toluene di-isocyanate, polyisocyanate prepolymers of aromatic type, toluene di-isocyanate based adducts, aromatic/aliphatic polyisocyanates and polyfunctional aliphatic isocyanates; wherein said reactants combine in a one-step addition process to yield an isocyanate terminated urethane prepolymer of controlled molecular weight to impart improved low shrink, dynamic impact strength and molding characteristics as measured by viscosity index properties in thermoset polyester resin products, and particularly sheet molding compositions (SMC) by covalently bonding to the polyester resin matrix of SMC.

11. The sheet-molding compound of claim 10 wherein the thickening agent includes a metallic oxide or hydroxide selected from Group IIA of the periodic table and consisting of calcium and magnesium oxides or hydroxides in an amount to react with at least 30 percent, but not more than 75 percent of the carboxyl groups present.

12. The sheet-molding compound of claim 11 wherein the polymerization catalyst is a free-radical polymerization catalyst.

13. The sheet-molding compound of claim 12 wherein the phase-stabilizing agent is selected from the group consisting of $C_5$–$C_{28}$ fatty acids, $C_{20}$–$C_{54}$ dimer or trimer acids, polyester polyols having an average molecular weight of about 200 to about 6,500, or mixtures thereof.

14. The sheet-molding compound according to claim 8, further comprising a mold release agent.

15. The sheet-molding compound according to claim 8, wherein the flexibility modifying agent is selected from the group consisting of polystyrene-polybutadiene-polystyrene, polystyrene-polyisoprene-polystyrene, polystyrene-ethylene/butylene-polystyrene and mixtures thereof.

16. The sheet-molding compound according to claim 8, wherein said flexibility modifying agent is present in its raw state in an amount of about 3 to about 20 percent by weight of the final composition.

17. The sheet-molding compound according to claim 8, wherein said fibrous reinforcing material is present in an amount of about 15 to about 25 percent by weight of the overall composition.

18. A sheet molding compound for making exterior body panels for vehicles which exhibit increased flexibility, said sheet molding compound comprising:
    (a) a thermosetting resin including an unsaturated polyester resin having (1) a ratio of hydroxyl groups to carboxyl groups of between 5.7 and 0.8, and (2) an acid number of at least 14, and (3) an average molecular weight between about 800 and 5,000;
    (b) a thickening agent;
    (c) a polymerization catalyst;
    (d) fibrous reinforcing material;
    (e) a phase stabilizing agent;
    (f) an inert filler;
    (g) a low shrink additive; and
    (h) a flexibility modifying agent including a copolymer having as its components a polystyrene-polybutadiene-polystyrene polymer and a polystyrene-polybutadiene polymer, said flexibility modifying agent being present in a sufficient amount to impart a decrease in modulus of elasticity of the sheet molding compound.

19. The sheet-molding compound according to claim 18 further comprising an isocyanate terminated urethane prepolymer.

20. The sheet-molding compound of claim 19 wherein said isocyanate terminated urethane prepolymer composition is an isocyanate terminated urethane prepolymer composition having an equivalent ratio of NCO to OH from about 1.2/1 to about 5/1, comprising a polyol and a di- or polyisocyanate, and being prepared by reacting (1) one equivalent weight of a polyol having an average molecular weight of about 600 to 4,000 and an average functionality of approximately 2 to approximately 6; and (2) 1.2 to 5 equivalent weights of a di- or polyisisocyanate selected from the group consisting of 80:20 or 65:35 isomer mixture of the 2,4- and 2,6-isomeric forms of toluene di-isocyanate, ethylene di-isocyanate, propylene di-isocyanate, meta-and para-phenyl di-isocyanate, 4,4'-diphenyl methane di-isocyanate (MDI) or a mixture of MDI and its trifunctional cyclic adduct products containing carbodiimide linkages, 1,5-naphthalene di-isocyanates, para- and meta-xylene di-iocyantes, alkylene di-isocyanate, or polymeric MDI containing an average of two isocyanate groups per molecule, toluene di-isocyanate, polyisocyanate prepolymers of aromatic type, toluene di-isocyanate based adducts, aromatic/aliphatic polyisocyanates and polyfunctional aliphatic isocyanates; wherein said reactants combine in a one-step addition process to yield an isocyanate terminated urethane prepolymer of controlled molecular weight to impart improved low shrink, dynamic impact strength and molding characteristics as measured by viscosity index properties in thermoset polyester resin products, and particularly sheet molding compositions (SMC) by covalently bonding to the polyester resin matrix of SMC.

21. The sheet-molding compound of claim 18 wherein the thickening agent includes a metallic oxide or hydroxide selected from Group IIA of the periodic table and consisting of calcium and magnesium oxides or hydroxides in an amount to react with at least 30 percent, but not more than 75 percent of the carboxyl groups present.

22. The sheet-molding compound of claim 21 wherein the polymerization catalyst is a free-radical polymerization catalyst.

23. The sheet-molding compound of claim 22 wherein the phase-stabilizing agent is selected from the group consisting of $C_5$–$C_{28}$ fatty acids, $C_{20}$–$C_{54}$ dimer or trimer acids, polyester polyols having an average molecular weight of about 200 to about 6,500, or mixtures thereof.

24. The sheet-molding compound according to claim 18 further comprising a mold release agent.

* * * * *

UNITED STATES PATENT AND TRADEMARK OFFICE
CERTIFICATE OF CORRECTION

PATENT NO. : 5,268,400
DATED : Dec. 7, 1993
INVENTOR(S) : Kenneth A. Iseler, Phoebe Duffield, Robert C. Yen It is certified that error appears in the above-indentified patent and that said Letters Patent is hereby corrected as shown below:

| | |
|---|---|
| Col. 2, line 65 | "("S-EB-S)" should be --("S-EB-S")-- |
| Col. 6, line 67 | "di-isocyantes" should be --di-isocyanates-- |
| Col. 7, line 45 | "triethytlolpropane" should be --triethylolpropane-- |
| Col. 11, line 55 | after "of" (first occurrence) delete "a" |
| Col. 12, line 62 | after "and" delete "is" |
| Col. 14, line 13 | after "one" insert --of-- |
| Col. 15, line 58 | "precent" should be --percent-- |
| Col. 18, line 7 | "polysisocyanate" should be --polyisocyanate-- |
| Col. 18, line 15 | "di-iocyantes" should be --di-isocyanates-- |

Signed and Sealed this

Fifth Day of July, 1994

Attest:

BRUCE LEHMAN

*Attesting Officer*          *Commissioner of Patents and Trademarks*